United States Patent
Jiang et al.

(10) Patent No.: US 11,108,503 B2
(45) Date of Patent: Aug. 31, 2021

(54) MULTIPLE TRAFFIC CLASS DATA AGGREGATION IN A WIRELESS LOCAL AREA NETWORK

(71) Applicant: NXP USA, Inc., Austin, TX (US)

(72) Inventors: Jinjing Jiang, San Jose, CA (US); Liwen Chu, San Ramon, CA (US); Lei Wang, San Diego, CA (US); Yakun Sun, Sunnyvale, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 156 days.

(21) Appl. No.: 15/448,303

(22) Filed: Mar. 2, 2017

(65) Prior Publication Data

US 2017/0257189 A1 Sep. 7, 2017

Related U.S. Application Data

(60) Provisional application No. 62/302,529, filed on Mar. 2, 2016, provisional application No. 62/324,232, filed on Apr. 18, 2016.

(51) Int. Cl.
*H04L 1/16* (2006.01)
*H04L 1/00* (2006.01)
(Continued)

(52) U.S. Cl.
CPC .......... *H04L 1/1635* (2013.01); *H04L 1/0079* (2013.01); *H04L 1/1614* (2013.01);
(Continued)

(58) Field of Classification Search
CPC ... H04L 1/0079; H04L 1/1614; H04L 1/1635; H04L 1/1671
See application file for complete search history.

(56) References Cited

U.S. PATENT DOCUMENTS 7,599,332 B2 10/2009 Zelst et al.
7,742,390 B2 6/2010 Mujtaba
(Continued)

FOREIGN PATENT DOCUMENTS

EP 1571773 A2 9/2005
EP 1779577 A1 5/2007
(Continued)

OTHER PUBLICATIONS

U.S. Appl. No. 15/299,325, filed Oct. 20, 2016.
(Continued)

*Primary Examiner* — Parth Patel
*Assistant Examiner* — Berhanu D Belete

(57) ABSTRACT

A first communication device receives an aggregated data unit from a second communication device. The aggregated data unit aggregates (i) one or more sets of multiple data units, each set of multiple data units to be acknowledged by a respective block acknowledgement and (ii) one or more single data units, each single data unit to be acknowledged by a respective single acknowledgement. The first communication device generates a block acknowledgment frame that includes (i) block acknowledgement information to acknowledge the one or more sets of multiple data units, and (ii) single acknowledgment information to acknowledge the one or more single data units, where the block acknowledgement frame omits an indication that the block acknowledgement frame includes the single acknowledgement information. The first communication device causes the block acknowledgement frame to be transmitted to the second communication device.

20 Claims, 9 Drawing Sheets

(51) Int. Cl.
*H04L 5/00* (2006.01)
*H04W 84/12* (2009.01)

(52) U.S. Cl.
CPC .......... *H04L 5/0055* (2013.01); *H04L 1/1671* (2013.01); *H04L 1/1685* (2013.01); *H04W 84/12* (2013.01)

(56) References Cited

U.S. PATENT DOCUMENTS

| | | | |
|---|---|---|---|
| 8,155,138 | B2 | 4/2012 | van Nee |
| 8,289,869 | B2 | 10/2012 | Sawai |
| 8,331,419 | B2 | 12/2012 | Zhang et al. |
| 8,332,732 | B2 | 12/2012 | Lakkis |
| 8,526,351 | B2 | 9/2013 | Fischer et al. |
| 8,527,853 | B2 | 9/2013 | Lakkis |
| 8,619,907 | B2 | 12/2013 | Mujtaba et al. |
| 8,724,720 | B2 | 5/2014 | Srinivasa et al. |
| 9,197,298 | B2 | 11/2015 | Kim et al. |
| 2005/0265297 | A1* | 12/2005 | Nakajima ............ H04L 1/1685 370/338 |
| 2006/0034274 | A1* | 2/2006 | Kakani ................ H04L 1/1829 370/389 |
| 2006/0136614 | A1* | 6/2006 | Kakani ................ H04L 1/1614 710/30 |
| 2007/0201364 | A1* | 8/2007 | Nakajima ............ H04L 1/1887 370/230 |
| 2008/0002615 | A1* | 1/2008 | Nakajima ............ H04L 1/1854 370/328 |
| 2009/0196163 | A1 | 8/2009 | Du |
| 2009/0252100 | A1* | 10/2009 | Sridhara ............... H04L 1/1854 370/329 |
| 2010/0246600 | A1* | 9/2010 | Das ....................... H04W 28/06 370/465 |
| 2011/0064065 | A1* | 3/2011 | Nakajima ............ H04L 1/1614 370/338 |
| 2011/0199971 | A1* | 8/2011 | Kim .................... H04W 28/065 370/328 |
| 2012/0314697 | A1* | 12/2012 | Noh ..................... H04L 1/1628 370/338 |
| 2013/0034061 | A1* | 2/2013 | Xie .................... H04W 72/1284 370/329 |
| 2013/0223345 | A1* | 8/2013 | Asterjadhi ............ H04L 69/04 370/328 |
| 2014/0036895 | A1* | 2/2014 | Liu ..................... H04L 1/1614 370/338 |
| 2014/0056223 | A1* | 2/2014 | Quan ................... H04W 28/18 370/328 |
| 2014/0192716 | A1* | 7/2014 | Pantelidou ........... H04L 1/1848 370/328 |
| 2015/0181620 | A1* | 6/2015 | Seok ................. H04W 74/0816 370/311 |
| 2015/0288501 | A1* | 10/2015 | Kwon .................. H04L 1/1614 370/329 |
| 2016/0028452 | A1 | 1/2016 | Chu et al. |
| 2016/0029373 | A1* | 1/2016 | Seok ..................... H04L 5/0055 370/338 |
| 2016/0113034 | A1* | 4/2016 | Seok ..................... H04W 74/04 370/329 |
| 2016/0278093 | A1* | 9/2016 | Negus .................. H04W 76/15 |
| 2017/0063509 | A1* | 3/2017 | Kim ..................... H04L 5/0055 |
| 2017/0149547 | A1* | 5/2017 | Kim ..................... H04B 7/2678 |
| 2017/0331587 | A1* | 11/2017 | Kim ..................... H04L 1/1614 |
| 2017/0359159 | A1* | 12/2017 | Kim ...................... H04L 5/005 |
| 2017/0373799 | A1* | 12/2017 | Noh ..................... H04L 1/1628 |
| 2018/0034595 | A1* | 2/2018 | Kim ..................... H04L 1/1614 |
| 2018/0124826 | A1* | 5/2018 | Seok .................... H04W 74/04 |
| 2018/0254857 | A1* | 9/2018 | Kim ..................... H04L 1/1614 |
| 2018/0324638 | A1* | 11/2018 | Chu ..................... H04L 1/1614 |
| 2018/0351725 | A1* | 12/2018 | Kim ..................... H04L 5/0055 |

FOREIGN PATENT DOCUMENTS

| | | |
|---|---|---|
| WO | WO-2009/059229 A1 | 5/2009 |
| WO | WO-2011/072164 A2 | 6/2011 |

OTHER PUBLICATIONS

U.S. Appl. No. 15/438,578, filed Feb. 21, 2017.

IEEE P802.11axTM/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11axTM/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11axTM/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11axTM/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

Chun et al., "Legacy Support on HEW frame structure," doc: IEEE 11-13/1057r0, *The Institute of Electrical and Electronics Engineers, Inc.*, pp. 1-8 (Sep. 2013).

Seok et al., "HEW PPDU Format for Supporting MIMO-OFDMA," IEEE 802.11-14/1210r0, 16 pages, (Sep. 14, 2014).

Stacey, "Specification Framework for TGax," doc. IEEE 802.11-15/0132r12, vol. 802.11ax, No. 12, 38 pages (Dec. 1, 2015).

IEEE Std 802.11TM 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11-REVmcTM/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

IEEE P802.11 nTM D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

(56) References Cited

OTHER PUBLICATIONS

IEEE Std. 802.11 nTM "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Van Nee et al. "The 802.11 n. MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).

IEEE Std 802.11adTM/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

Harada, "Project: IEEE P802.15 Working Group for Wireless Personal Area Network (WPANs)," IEEE 802.15-07-0693-003c, slides 24-33 (May 2007).

International Search Report and Written Opinion for PCT/US2017/020463 dated May 19, 2017.

International Preliminary Report on Patentability in International Patent Application No. PCT/US2017/020463, dated Sep. 13, 2018 (8 pages).

\* cited by examiner

MULTIPLE TRAFFIC CLASS DATA AGGREGATION IN A WIRELESS LOCAL AREA NETWORK

CROSS-REFERENCES TO RELATED APPLICATIONS

This disclosure claims the benefit of U.S. Provisional Patent Application No. 62/302,529, entitled "Enabling Multi-TID Aggregation for 60 GHz WLAN" and filed on Mar. 2, 2016, and U.S. Provisional Patent Application No. 62/324,232, entitled "Enabling Multi-TID Aggregation for 60 GHz WLAN" and filed on Apr. 18, 2016, the disclosures of which are hereby expressly incorporated herein by reference in their entireties.

FIELD OF THE DISCLOSURE

The present disclosure relates generally to communication networks and, more particularly, to wireless local area networks (WLANs) that utilize data aggregation.

BACKGROUND

Wireless local area networks (WLANs) have evolved rapidly over the past decades. WLAN standards such as the Institute for Electrical and Electronics Engineers (IEEE) 802.11a, 802.11g, 802.11n, 802.11ac and 802.11ad Standards have been developed to specify WLAN operation in various frequency bands and with various peak data throughputs. For example, the IEEE 802.11a and 802.11g Standards specify operation in the 2.4 GHz frequency band with a single-user peak throughput of 54 Mbps, the IEEE 802.11n Standard specifies operation in 2.4 GHz and 5.0 GHz frequency bands with a single-user peak throughput of 600 Mbps, and the IEEE 802.11ac Standard specifies operation in 5.0 GHz frequency band with a single-user peak throughput in the gigabits per second (Gbps) range. The IEEE 802.11ad Standard specifies operation in 60 GHz frequency band with a single-user peak throughput of 7 Gbps. Future standards that will specify operation in various frequency bands promise to provide even greater throughputs, such as throughputs in the tens or hundreds of Gbps range.

SUMMARY

In an embodiment, a method for acknowledging receipt of a transmission in a communication network includes receiving, at a first communication device from a second communication device, an aggregated data unit that aggregates (i) one or more sets of multiple data units, each set of multiple data units to be acknowledged by a respective block acknowledgement and (ii) one or more single data units, each single data unit to be acknowledged by a respective single acknowledgement; generating, at the first communication device, a block acknowledgment frame that includes (i) block acknowledgement information to acknowledge the one or more sets of multiple data units, and (ii) single acknowledgment information to acknowledge the one or more single data units, wherein the block acknowledgement frame omits an indication that the block acknowledgement frame includes the single acknowledgement information; and causing the block acknowledgement frame to be transmitted from the first communication device to the second communication device.

In another embodiment, an apparatus comprises a network interface having one or more integrated circuits configured to receive an aggregated data unit that aggregates (i) one or more sets of multiple data units to be acknowledged by respective one or more block acknowledgements and (ii) one or more single data units to be acknowledged by respective single acknowledgements. The one or more integrated circuits are also configured to generate a block acknowledgment frame that includes (i) block acknowledgement information to acknowledge the one or more sets of multiple data units, and (ii) single acknowledgment information to acknowledge the one or more single data units, wherein the block acknowledgement frame omits an indication that the block acknowledgement frame includes the single acknowledgement information. The one or more integrated circuits are further configured to cause the block acknowledgment data unit to be transmitted.

DETAILED DESCRIPTION

Figure 1:
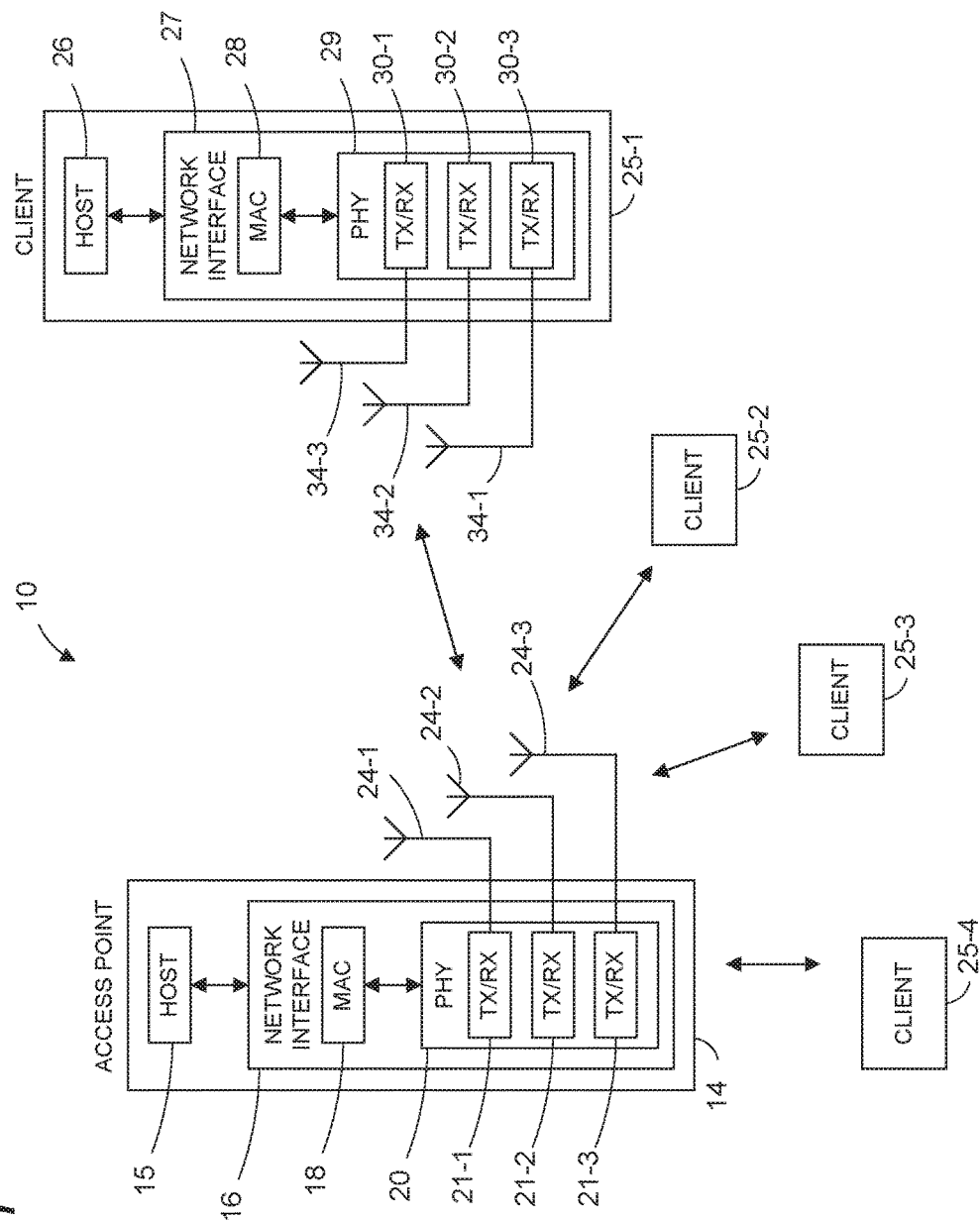
FIG. 1 is a block diagram of an example wireless local area network (WLAN) in which methods and apparatuses described herein are utilized, according to an embodiment.

In embodiments described below, a first communication device transmits a data unit to a second communication device in a communication network. Upon receiving the data unit, the second communication device acknowledges receipt of the data unit by transmitting at least one acknowledgement data unit (sometimes referred to herein as "acknowledgment frame") to the first communication device. In one exemplary embodiment, the first communication device aggregates, in a single physical layer (PHY) data unit to be transmitted to the second communication device, multiple higher layer data units, such as media access control (MAC) data units, for transmission to the second communication device. In some embodiments, the multiple higher level data units aggregated in the PHY data unit include one or more sets of higher level data units, the higher level data units in a set of higher level data unit to be collectively acknowledged by a block acknowledgement from the second communication device. In some embodiments, the one or more sets of higher level data units aggregated in the PHY layer data unit include multiple sets of higher level data units respectively corresponding to different ones of a plurality of traffic classes associated with different quality of service (QoS) requirements and/or different transmission priorities. Additionally, in some embodiments, the multiple higher level data units aggregated in the PHY data unit include one or more single higher level data units, respectively corresponding to one or more traffic classes, to be acknowledged by single individual acknowledgements from the second communication device. Further, in some embodiments, the multiple higher level data units aggregated in the PHY data unit additionally include at least one management data unit (sometimes referred to herein as "management frame") and/or at least one control data unit (sometimes referred to herein as "control frame") from the first communication device to the second communication device.

In an embodiment, upon receiving the PHY data unit that includes aggregated multiple higher level data units, the second communication device transmits a single acknowledgement frame to acknowledge receipt of the multiple higher level data units to the first communication device. In an embodiment, the acknowledgement frame includes some or all of (i) block acknowledgement information to acknowledge one or more sets of higher level data units, respectively corresponding to one or more different traffic classes, in the received PHY data unit, (ii) single acknowledgement information to acknowledge one or more single higher level data units, respectively corresponding to one or more different traffic classes, in the received PHY data unit and (iii) management acknowledgement information to acknowledge one or more management frames and/or control frames in the received PHY data unit. Aggregating, in a single PHY data unit, one or more sets of higher level data units corresponding to one or more different traffic classes with one or more single higher level data units and/or with one or more management/control frames, and using a single acknowledgement frame to acknowledge the received aggregated higher level data units and/or management/control frames in the single PHY data unit, generally improves transmission efficiency and communication data rates in the network by eliminating individual transmission and acknowledgement of such higher level data units, in at least some scenarios and embodiments.

FIG. 1 is a block diagram of an example wireless local area network (WLAN) 10, according to an embodiment. The WLAN 10 includes a central point device 14. In an embodiment, the central point device 14 is an AP). For ease of explanation, the central point device 14 is generally referred to herein as an AP 14. However, the central point device 14 is a suitable central point device different from an AP, in some embodiments. For example, the central device 14 is a personal basic service set (PBSS) control point (PCP), in an embodiment. The AP 14 includes a host processor 15 coupled to a network interface 16. In an embodiment, the network interface 16 includes one or more integrate circuits (ICs) configured to operate as discussed below. The network interface 16 includes a MAC processor 18 and a PHY processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., according to an enhance directional multi gigabit (EDMG) protocol, the IEEE 802.11ay Standard, etc.). In some embodiments, the MAC processor 18 and the PHY processor 20 are also configured to operate according to a second communication protocol (e.g., according to the IEEE 802.11ad Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol (e.g., according to the IEEE 802.11ay Standard). In an embodiment, the first communication protocol defines operation in a very high frequency band, such as the unlicensed 60 GHz frequency band. In some embodiments, at least one of the client stations 25 is not configured to operate according to the first communication protocol but is configured to operate according to at least a second communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, a third communication protocol, and/or a fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC management frames, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC management frames, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2A:
FIG. 2A is a diagram of an example physical layer (PHY) data unit transmitted using channel bonding, according an embodiment.

FIG. 2A is a diagram of a PHY data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the first communication protocol and occupies a 2.16 GHz bandwidth. Data units similar to the data unit 200 occupy other suitable bandwidth such as 4.32 GHz, 6.48 GHz, 8.64 GHz, 10.8 GHz, 12.96 GHz, for example, or other suitable bandwidths, in other embodiments. The data unit 200 includes a PHY preamble/header 210 and a data portion 220. The preamble/header 210 includes one or more training fields generally used for synchronization and channel estimation, in an embodiment. The preamble/header 210 additionally includes one or more signal fields used to indicate various parameters needed at a receiving communication device to properly decode the data portion 220, in an embodiment.

Figure 2B:
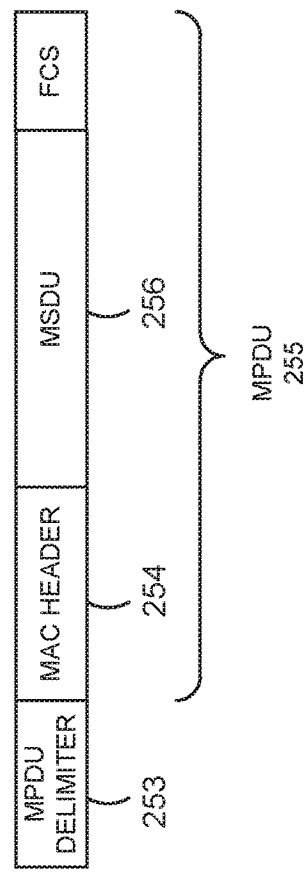
FIG. 2B is a diagram of an example data portion of the PHY data unit of FIG. 2A, according to an embodiment.

FIG. 2B is a diagram of a MAC layer data unit 240, according to an embodiment. In an embodiment, the MAC layer data unit 240 is included in the data portion 220 of the PHY data unit 200 of FIG. 2A. In another embodiment, the MAC layer data unit 240 is included in a data portion of a PHY data unit different from the PHY data unit 200 of FIG. 2A. The MAC layer data unit 240 includes a MAC protocol data unit (MPDU) delimiter 253 followed by an MPDU 255. The MPDU 255 includes a MAC header 254 and a MAC layer service data unit (MSDU) 256. In some embodiments, the data portion 220 of the PHY data unit 200 of FIG. 2A includes an aggregate MPDU (A-MPDU) that aggregates multiple MPDU delimiter fields 253, each MPDU delimiter field 253 followed by a respective MPDU 255. In some embodiments, each of one or more of the MSDUs 256 included in the data unit 240 is an aggregate MSDU (A-MSDU) that aggregates multiple MSDUs. In such embodiments, the MAC header 254 of the A-MSDU is followed by multiple MSDUs. In an embodiment, the first communication protocol defines a maximum number of MPDUs and, accordingly, a maximum number of MSDUs/A-MSDUs, that can be aggregated in a single A-MPDU. For example, the first communication protocol specifies that a maximum of 256 MPDUs, 512 MPDUs, 1024 MPDUs, or any other suitable number of MPDUs, can be aggregated in a single A-MPDU, in an embodiment. In another embodiment, the first communication protocol specifies another suitable maximum number of MPDUs that can be aggregated in a single A-MPDU.

In some embodiments, the MAC layer data unit 240 additionally includes one or more padding portions (not illustrated), each of the one or more padding portions having one or more padding bits. For example, a respective padding portion is included with (e.g., appended to) each of the one or more MPDUs 255 and/or MSDUs 256 in the data unit 240 to ensure that each MPDU 255 and/or MSDU 256 includes an integer number of octets of bits indicated by a length indicator in the MPDU delimiter 253 that immediately precedes the MPDU 255, in an embodiment.

Figure 3:
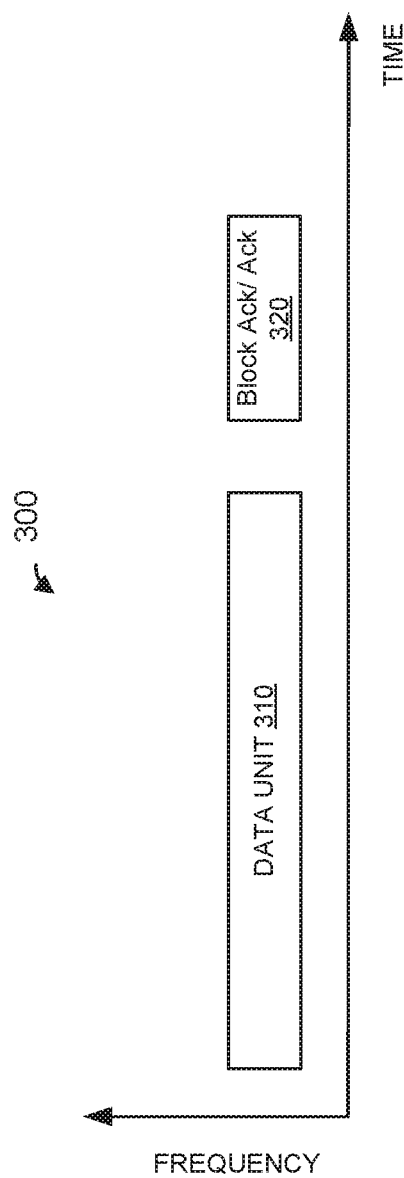
FIG. 3 is a diagram of an example transmission sequence in a WLAN, according to an embodiment.

FIG. 3 is a diagram of an example transmission sequence 300 in a WLAN such as the WLAN 10, according to an embodiment. A transmitting device generates and transmits a data unit 310. In an embodiment, the data unit 310 corresponds to the data unit 200 of FIG. 2A. In another embodiment, the data unit 310 is a suitable data unit different from the data unit 200 of FIG. 2A. A receiving device receives the data unit 310 and, in response to receiving the data unit 310, generates and transmits an acknowledgement data unit (sometimes referred to herein as "acknowledgement frame") 320 to acknowledge receipt of the data unit 310. In an embodiment, the transmitting device is the AP 14 and the receiving device is a client station (e.g., the client station 25-1). In another embodiment, the transmitting device is a client station (e.g., the client station 25-1) and the receiving device is the AP 14. In yet another embodiment, the transmitting device is a first client station 25 (e.g., the client station 25-1) and the receiving device is a second client station 25 (e.g., the client station 25-2).

In an embodiment, the data unit 310 is an A-MPDU that aggregates multiple MPDUs, and, accordingly, the data unit 310 is sometimes referred to herein as an A-MPDU 310. In an embodiment, the A-MPDU 310 includes one or more MPDUs corresponding to each of one or more traffic classes, where each traffic class is associated with a particular traffic type (e.g., network control, video, voice, streaming multimedia, etc.). In an embodiment, the traffic classes are associated with particular QoS requirements and/or priority levels. In an embodiment, each traffic class corresponds to a particular traffic identifier (TID). In an embodiment, the A-MPDU includes one or more sets of multiple MPDU corresponding to one or more traffic classes for which block acknowledgement sessions have been previously set up between the transmitting device and the receiving device and are currently active. For example, the A-MPDU 310 includes a first set of multiple MPDUs corresponding to a first traffic class, such as a traffic class that corresponds to voice traffic, for which a first block acknowledgement session between the transmitting device and the receiving device is currently active, in an embodiment. The A-MPDU 310 additionally or alternatively includes a second set of multiple MPDUs corresponding to a second traffic class, such as a traffic class that corresponds to video traffic, for which a second block acknowledgement session between the transmitting device and the receiving device is currently active.

In some embodiments, the A-MPDU 310 additionally includes one or more single MPDUs corresponding to one or more traffic classes for which no block acknowledgement session is currently active between the transmitting device and the receiving device. For example, continuing with the embodiment above, in addition to the first set of MPDUs corresponding to the first traffic class and/or the second set of MPDUs corresponding to the second traffic class, the A-MPDU 310 includes a single MPDU corresponding to a third traffic class, such as a traffic class corresponding to best effort traffic, and/or a single MPDU corresponding to a fourth traffic class, such as a traffic class corresponding to excellent effort traffic, for which no block acknowledgement session is currently active between the transmitting device and the receiving device.

In an embodiment, the A-MPDU 310 additionally or alternatively includes one or more management and/or control frames for which acknowledgement is required or expected. Management frame included in the A-MPDU 310 generally carry information used to manage communication devices operating in the WLAN 10, in at least some embodiments. Examples of management frames included in the A-MPDU 310, according to some embodiments, include an association request data unit, an association response data unit, a re-association request data unit, a re-association response data unit, a probe request data unit, a probe response data unit, etc. Control frames included in the A-MPDU 310 generally carry information used to assist in delivery of data and/or control channel access in the WLAN 10, in at least some embodiments. Examples of control frames included in the A-MPDU 310 include a power save poll (PS-poll) data unit, a block acknowledgement request data unit, etc. In an embodiment, the number of management and/or control frames that can be included in the A-MPDU 310 is limited to one management frame or one control frame. In another embodiment, the A-MPDU 310 includes multiple management frames and/or control frames. In an embodiment, a management frame included in the A-MPDU 310 is a unicast frame from the transmitting device to the receiving device. Aggregation of multicast or broadcast management and control frames in the A-MPDU 310 is not allowed, in an embodiment.

Upon receiving the A-MPDU 310, the receiving device transmits the acknowledgement frame 320 to the transmitting device. The acknowledgement frame 320 is a MAC control frame, in an embodiment. The acknowledgement frame 320 is a block acknowledgement (BA) frame, in an embodiment. Accordingly, the acknowledgment frame 320 is sometimes referred to herein as a "block acknowledgement frame" or a "BA frame". The block acknowledgement frame 320 includes block acknowledgement information including one or more block acknowledgements to acknowledge respective sets of MPDUs, included in the A-MPDU 310, corresponding to the one or more traffic classes for which block acknowledgement sessions have been previously set up and are currently active between the transmitting device and the receiving device. Further, in an embodiment, the block acknowledgment frame 320 includes single acknowledgement information including one or more single acknowledgements to acknowledge the respective one or more single MPDUs, included in the A-MPDU 310, for which no block acknowledgement sessions are currently active between the transmitting device and the receiving device. In an embodiment, the block acknowledgement frame 320 includes one or more fields for acknowledging single MPDU corresponding to respective traffic classes. In an embodiment, the one or more fields for acknowledging single MPDU corresponding to respective traffic classes are present in the block acknowledgement frame 320 regardless of whether or not single MPDUs corresponding to the traffic classes are actually included in the A-MPDU 310. Accordingly, the block acknowledgement frame 320 omits an indication of whether or not the one or more fields for acknowledging single MPDU corresponding to respective traffic classes are present in the block acknowledgement frame 320, in this embodiment. As just an example, the block acknowledgement frame 320 includes a bitmap field for acknowledging receipt of single MPDUs corresponding to different traffic classes that may be included in the A-MPDU 310, where each bit in the bitmap corresponds to a respective traffic class and is used to acknowledge receipt of a single MPDU corresponding to the traffic class. In an embodiment, the block acknowledgement frame 320 (i) includes the bitmap field regardless of whether or not the A-MPDU 310 includes any single MPDUs of the traffic classes and (ii) omits an indication of whether or not the bitmap field is included in the block acknowledgement frame 320. In this embodiment, if no single MPDUs to be acknowledged by single acknowledgements are included in the A-MPDU 310, then each bit in the bitmap is set to a value (e.g., a logic zero) that indicates and an MPDU of the corresponding traffic class was not received in the A-MPDU 310.

In some embodiments, the block acknowledgement frame 320 additionally includes acknowledgement information to acknowledge one or more management frames and/or control frames, included in the A-MPDU 310, for which acknowledgement is required or expected.

In some embodiments, prior to the transmission sequence 300, the transmitting device and the receiving device negotiate aggregation and/or block acknowledgement parameters to be used in the transmission sequence 300. For example, the transmitting device and/or the receiving device announces whether or not the device supports aggregation of MPDUs corresponding to multiple traffic classes in a single A-MPDU and/or aggregation of management frames with MPDUs that include data. Thus, for example, if the receiving device and the transmitting device both support aggregation of MPDUs corresponding to multiple traffic classes, then the transmitting device aggregates MPDUs corresponding to multiple traffic classes in the A-MPDU 310, in at least some situations, in an embodiment. On the other hand, of the receiving device an/or the transmitting device does not support aggregation of MPDUs corresponding to multiple traffic classes, the transmitting device limits aggregation in the A-MPDU 310 to only a single traffic class, in an embodiment.

In an embodiment, the transmitting device and/or the receiving device additionally or alternatively announces whether or not the device supports acknowledgement of MPDUs corresponding to multiple traffic classes in a single acknowledgement frame. If the transmitting device and the receiving device both support acknowledgement of MPDUs corresponding to multiple traffic classes in a single acknowledgement frame, then the receiving device includes acknowledgement information corresponding to multiple traffic classes in the block acknowledgement frame 320. On the other hand, in an embodiment, if the receiving device and/or the transmitting device does not support acknowledgement of MPDUs corresponding to multiple traffic classes in a single acknowledgement frame, and the A-MPDU 310 that aggregates multiple MPDUs corresponding to multiple traffic classes, then the receiving devices may acknowledge the A-MPDU 310 by transmitting multiple acknowledgement data units (e.g., included in respective PHY data units transmission of which is separated by an interframe space) that respectively acknowledge MPDUs of different traffic classes.

Figure 4:
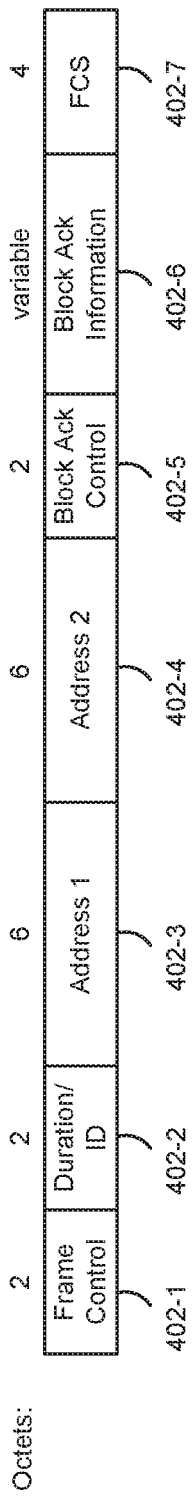
FIG. 4 is a diagram of an example block acknowledgement (BA) frame, according to an embodiment.

FIG. 4 is a diagram of an example acknowledgement frame 400, according to an embodiment. In an embodiment, the acknowledgement frame 400 corresponds to the acknowledgement frame 320 of FIG. 3. In another embodiment, the acknowledgement data unit 320 of FIG. 3 is different from the acknowledgement frame 400. The acknowledgement frame 400 includes a plurality of fields 402. In the embodiment illustrated in FIG. 4, the fields 402 include a frame control field 402-1, a duration/id field 402-2, a first address (e.g., receiver address) field 402-3, a second address (e.g., transmitter address) field 402-4, a Block Ack control field 402-5, a Block Ack information field 402-6, and a data unit sequence check (FCS) field 402-7. The number indicated in FIG. 4 above each of the fields 402 indicates the number of octets of bits in the corresponding field 402, according to an example embodiment.

Figure 5:
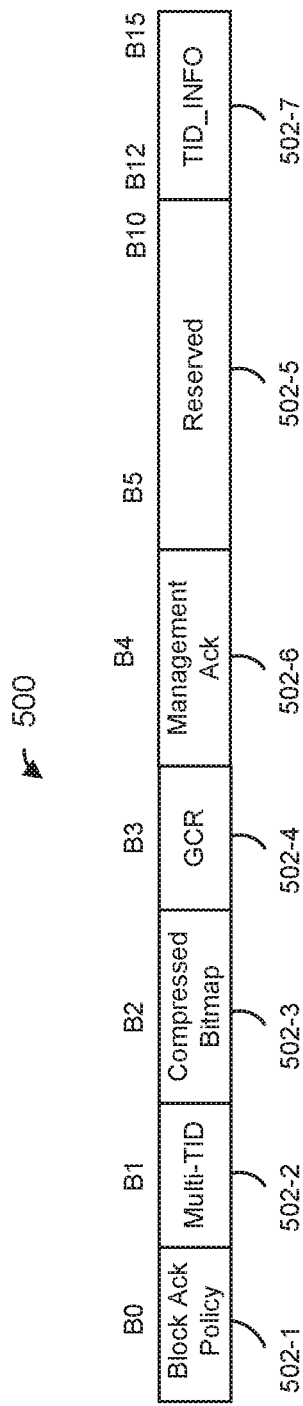
FIG. 5 is a diagram of an example Block Ack control field included in a BA frame, according to an embodiment.

FIG. 5 is a diagram of an example Block Ack control field 500 included in an acknowledgement frame, according to an embodiment. The Block Ack control field 500 corresponds to the Block Ack control field 402-5, in an embodiment. The Block Ack control field 500 includes a plurality of subfields 502. The subfields 502 collectively comprise 16 bits, in the illustrated embodiment. The subfields 502 collectively comprise a suitable number of bits different than 16 bits, in other embodiments. In the embodiment illustrated in FIG. 5, the Block Ack control field 500 includes a Block Ack policy subfield 502-1, a multi-TID subfield 502-2, a compressed bitmap subfield 502-3, a GroupCast with Retries (GCR) subfield 502-4, a reserved subfield 502-5, a management acknowledgement subfield 502-6, and a TID information subfield 502-7. Bit allocation for each of the subfields 502, according to an example embodiment, is illustrated in FIG. 5 above the corresponding subfields 502.

In an embodiment, the management acknowledgement subfield 502-6 indicates successful or unsuccessful receipt of a management frame included in an A-MPDU being acknowledged by the acknowledgement frame that includes the control field 500. For example, the acknowledgement subfield 502-6 is set to a logic one (1) to indicate that the management frame was successfully received, and is set to a logic zero (0) to indicate that the management frame was not successfully received (e.g., not received or received with error), or vice-versa, in an embodiment.

Figure 6:
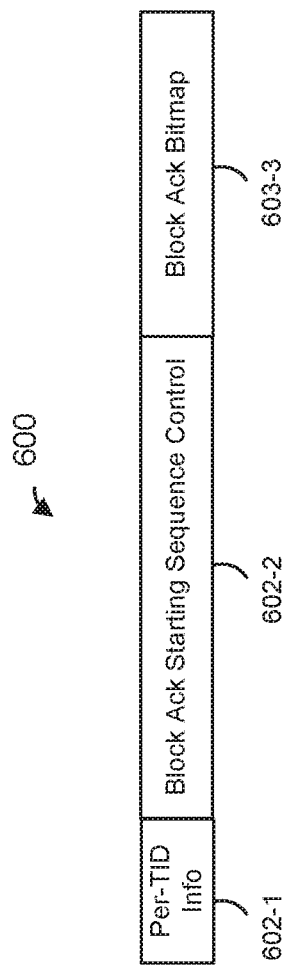
FIG. 6 is a block diagram of an example per-traffic class Block Ack information subfield included in a Block Ack information field of a BA frame, according to an embodiment.

FIG. 6 is a block diagram of a per-TID Block Ack information subfield 600 included in a Block Ack information field, according to an embodiment. The per-TID Block Ack information subfield 600 includes a plurality of subfields 602. In the embodiment illustrated in FIG. 6, the subfields 602 include a per-TID information subfield 602-1, a Block Ack starting sequence control subfield 602-2 and a Block Ack bitmap subfield 602-3. In an embodiment, the Block Ack information field 402-6 includes one or more per-TID Block Ack information subfields 600. In an embodiment, the one or more per-TID Block Ack information fields 600 include a first set of per-TID Block Ack information fields 600, where each per-TID Block Ack information field 600 in the first set includes a block acknowledgement to acknowledge a set of multiple MPDUs, of a particular traffic class, included in the A-MPDU being acknowledged. The one or more per-TID Block Ack information fields 600 also include a second set of one or more per-TID Block Ack information fields 600, where each per-TID Block Ack information field 600 in the second set includes one or more single acknowledgements to acknowledge receipt of one or more single MPDUs included in the A-MPDU being acknowledged, in an embodiment.

Figure 7:
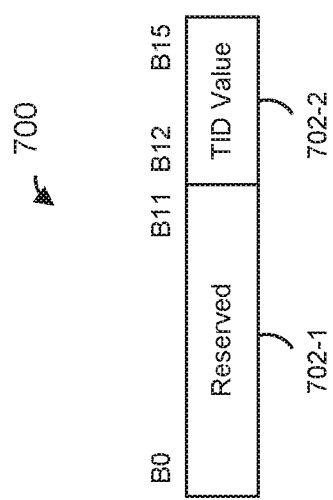
FIG. 7 is a diagram of an example traffic class information field included in a Block Ack information field of a BA frame, according to an embodiment.

Referring briefly to FIG. 7, a per-TID information subfield 700 corresponds to the per-TID information subfield 602-1 of FIG. 6, according to an embodiment. In an embodiment, the per-TID information subfield 700 is included in a per-TID Block Ack information field that includes a block acknowledgement to acknowledge a set of multiple MPDUs of a particular traffic class, according to an embodiment. For ease of explanation, the per-TID information subfield 700 is described with reference to the per-TID Block Ack information field 600 of FIG. 6. However, the per-TID information subfield 700 is included in a per-TID information field different from the per-TID Block Ack information field 600 of FIG. 6, in some embodiments.

The per-TID information subfield 700, itself, includes a plurality of subfields 702. The plurality of subfields 702 includes a reserved subfield 702-1 and a TID value subfield 702-2, in the illustrated embodiment. The TID value subfield 702-2 identifies a traffic class to which the per-TID Block Ack information field 600 corresponds. For example, the TID value subfield 702-2 includes a TID of the traffic class to which the per-TID Block Ack information subfield 600 corresponds. In an embodiment, the TID value subfield 702-2 includes four bits and indicates one of 16 predetermined traffic classes. In another embodiment, the TID value subfield 702-2 includes a suitable number of bits less than or greater than four bits and/or indicates one of a suitable number of predetermined traffic classes less than or greater than 16 predetermined traffic classes.

Referring back to FIG. 6, the Block Ack starting sequence control subfield 602-2 indicates a sequence number corresponding to the first one of the data units, of the traffic class indicated by the per-TID information subfield 602-1, included in the A-MPDU being acknowledged. Further, each bit of the Block Ack bitmap subfield 602-3 acknowledges a data unit with a sequence number that equals the sequence number indicated by the Block Ack starting sequence control field 602-2 plus the index of the bit, in an embodiment. Thus, for example, the first bit (bit index 0) of the Block Ack bitmap subfield 602-3 acknowledges the data unit with the sequence number indicated by the Block Ack starting sequence control subfield 602-2, the second bit (bit index 1) of the Block Ack bitmap subfield 602-3 acknowledges the data unit with a sequence number indicated by the Block Ack starting sequence control subfield 602-2 plus 1, etc., in an embodiment. In an embodiment, the value of each bit of Block Ack bitmap subfield 602-3 indicates whether the corresponding data unit was successfully received. For example, a value of logic one (1) of a bit of the Block Ack bitmap subfield 602-3 indicates that the corresponding data unit was successfully received, and a value of logic zero (0) of a bit of the Block Ack bitmap subfield 602-3 indicates that the corresponding data unit was not successfully received (e.g., not received or received with an error).

In an embodiment, the Block Ack bitmap subfield 602-3 is of variable length (e.g., includes a variable number of bits). In an embodiment, the number of bits in the Block Ack bitmap subfield 602-3 is selected from a set of predetermined numbers of bits. For example, the set of predetermined numbers of bits includes 64 bits, 128 bits, 256 bits, 512 bits and 1024 bits. In other embodiments, the set of predetermined numbers of bits includes other suitable numbers of bits in addition to or instead of one or more of 64 bits, 128 bits, 256 bits, 512 bits and 1024 bits. In an embodiment, the particular number of bits in the Block Ack bitmap field 602-3 is selected based on a maximum length of the A-MPDU being acknowledged and/or based on a maximum number of MPDUs of the traffic class indicated by the per-TID information subfield 602-1 that can be included in the A-MPDU being acknowledged. Thus, for example, (i) if the maximum number of MPDUs, of the traffic class, that can be included in the A-MPDU being acknowledged is less than or equal to 64, then the Block Ack bitmap field 602-3 includes 64 bits, (ii) if the maximum number of MPDUs, of the traffic class, that can be included in the A-MPDU being acknowledged is greater than 64 but less than or equal to 128, then the Block Ack bitmap field 602-3 includes 128 bits, and so on, in an embodiment.

In an embodiment in which the Block Ack bitmap subfield 602-3 includes a variable number of bits, the per-TID Block Ack information subfield 600 includes an indication that indicates the particular number of bits in the Block Ack bitmap subfield 602-3. For example, one or more bits of the per-TID information subfield 602-1 are set to indicate the particular number of bits included in the Block Ack bitmap field 602-3. As an example, referring to FIG. 7, three bits of the reserved subfield 702-1 (e.g., bits B0-B2) of the per-TID information subfield 700 are set to indicate the number of bits in the Block Ack bitmap subfield 602-3. In another embodiment, one or more bits (e.g., three bits) of the Block Ack starting sequence control subfield 602-2 are set to indicate the number of bits in the Block Ack bitmap field 602-3. For example, in an embodiment in which acknowledgement of frame fragments is not used or disallowed, three bits of a fragment number subfield (e.g., B0-B2) of the Block Ack starting sequence control subfield 602-2 are set to indicate the number of bits in the Block Ack bitmap field 602-3, in an embodiment. In an embodiment, a first value of the three bits (e.g., 000) indicates that the Block Ack bitmap subfield 602-3 comprises 64 bits, a second value of the three bits (e.g., 001) indicates that the bitmap subfield 602-3 comprises 128 bits, an so on, in an embodiment. In another embodiment, another suitable number bits less than or greater than three bits is used to indicate the length of the Block Ack bitmap field 602-3 and/or the bits indicate other suitable predetermined lengths of the Block Ack bitmap field 602-3.

In an embodiment in which the Block Ack bitmap field 602-3 is of variable length, the transmitting device and the receiving device negotiate a number of traffic classes and/or a number of MPDUs that can be included in respective sets of MPDUs corresponding to each of the traffic classes that can be included in a single A-MPDU (e.g., the A-MPDU 310) such that the total length of an acknowledgement frame (e.g., the acknowledgement frame 320) is equal to or less than an acknowledgement frame for acknowledging an A-MPDU that includes a maximum number of MPDU in a set of MPDUs corresponding to a single traffic class. As just an, in an embodiment in which a maximum number of MPDU of a single traffic class that can be included in an A-MPDU that includes MPDUs corresponding to only the single traffic class is 1024, the transmitting device and the receiving device agree, via negotiation, that a single A-MPDU can include MPDUs corresponding to up to four traffic classes such that the total number of MPDUs corresponding to the up to four traffic classes does not exceed 1024 MPDUS. In this embodiment, the A-MPDU 310 can include a first set of MPDUs corresponding to a first traffic class and a second set of MPDUs corresponding to a second traffic class, where the maximum number of MPDUs in the first set of MPDUs is 512 and the maximum number of MPDUs in the second set of MPDUs is 512. Similarly, continuing with the same embodiment, the A-MPDU 310 can include four sets of MPDUs corresponding to four different traffic classes, where a maximum number of MPDUs corresponding to each of the four traffic classes is 256.

In some embodiments, the Block Ack bitmap subfield 602-3 is of fixed length. For example, in an embodiment, the Block Ack bitmap subfield 602-3 includes a fixed number of bits regardless of the number of MPDUs, of the traffic class indicated by the per-TID information subfield 602-1, included in the A-MPDU being acknowledged. For example, the Block Ack bitmap subfield 602-3 includes a number of bits corresponding to a maximum number of MPDUs that can be included in the A-MPDU being acknowledged. As another example, the Block Ack bitmap subfield 602-3 includes a number of bits corresponding to a maximum number of MPDUs of the corresponding traffic class, indicated by the per-TID information subfield 602-1, that can be included in the A-MPDU being acknowledged. In embodiments in which the Block Ack bitmap subfield 602-3 is of fixed length, the per-TID Block Ack information subfield 600 omits an indication of a number of bits included in the Block Ack bitmap subfield 602-3 because the number of bits is known a priori to a receiving device.

Figure 8A:
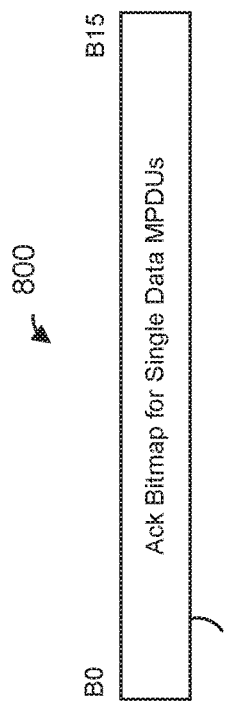
FIGS. 8A-8C are diagrams of example single acknowledgement (Ack) information fields included in a Block Ack information field of a BA frame, according to various embodiments.
Figure 8B:
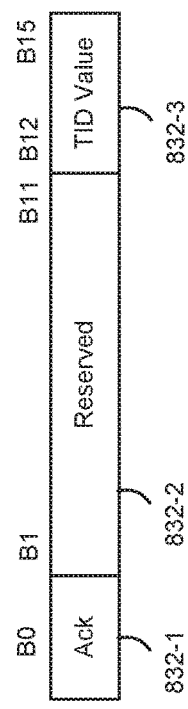
Figure 8C:
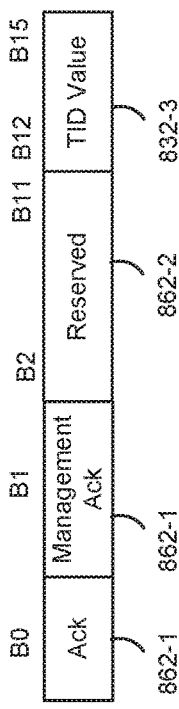

In an embodiment, in addition to one or more per-TID Block Ack information subfields 600 that include block acknowledgements that acknowledge sets of multiple data units in the A-MPDU being acknowledged, the Block Ack information field 402-6 includes one or more single Ack information subfields that include single acknowledgements that acknowledge single MPDUs in the A-MPDU being acknowledged. FIGS. 8A-8C are diagrams of example single acknowledgement (Ack) information subfields 800, 830, 860, according to various embodiments. For ease of explanation, the single Ack information subfields 800, 830, 860 are described with reference to the acknowledgement frame 400 of FIG. 4. However, the single Ack information subfields 800, 830, 860 are included in acknowledgement frames different from the acknowledgement frame 400 of FIG. 4, in some embodiments.

Referring first to FIG. 8A, the single Ack information subfield 800 generally corresponds to the per-TID information subfield 602-1 of the Block Ack information subfield 600 of FIG. 6, in an embodiment. Further, in an embodiment, the single Ack information subfield 800 omits the Block Ack starting sequence control subfield 602-2 and the Block Ack bitmap subfield 603-3 that are included in the Block Ack information subfield 600 of FIG. 6. The single Ack information subfield 800 includes a bitmap 802. In an embodiment, each bit of the bitmap 802 corresponds to a traffic class and is used to indicate whether a single MPDU of the corresponding traffic class, included in the A-MPDU being acknowledged was successfully received. For example, in an embodiment, a first value (e.g., logic one (1)) of a bit, in the bitmap 802, corresponding to a traffic class indicates that a single MPDU of the traffic class included in the A-MPDU being acknowledged was successfully received, and a second value of the bit (e.g., logic zero (0)) indicates that no single MPDU of the corresponding traffic class was successfully received in the A-MPDU being acknowledge, in an embodiment. Thus, for example, in an embodiment in which the A-MPDU being acknowledged includes a first single MPDU corresponding to traffic class 3 and a second single MPDU corresponding to traffic class 4, bits 3 and 4 in the bitmap 802 are set to logic one (1) to respectively indicate that the first single MPDU and the second single MPDU was successfully received, and the remaining bits in the bitmap 802 are set to logic zero (0), in an embodiment.

In an embodiment, the single Ack information subfield 800 (and, accordingly, the bitmap 802) is included in the Block Ack information field 402-6 by default and regardless of whether or not any single MPDUs were included in the A-MPDU being acknowledged. In an embodiment, the single Ack information subfield 800 is included in a predetermined location within the Block Ack information field 402-6. For example, the single Ack information subfield 800 is included as the first field or the last field in the Block Ack information field 402-6. In an embodiment in which the single Ack information subfield 800 is included in the Block Ack information field 402-6 by default, if no single MPDUs were included in the A-MPDU being acknowledged, then each bit in the bitmap 802 is set (e.g., to a logic zero) to indicate that no single MPDUs were successfully received.

In another embodiment, the acknowledgement frame 400 includes a Single MPDU Ack indication to indicate whether or not the single Ack information subfield 800 (and, accordingly, the bitmap 802) is included in the Block Ack information field 402-6. For example, the Block Ack control field 500 includes a Single MPDU Ack indication. More specifically, in an embodiment, a reserved bit (e.g., B5) of the Block Ack control field 500 is used as the Single MPDU Ack indication, in an embodiment. In an embodiment, if the Single MPDU Ack indication is set to a value (e.g., a logic one (1)) that indicates that the single Ack information subfield 800 is included in the Block Ack information field 402-6, then the single Ack information subfield 800 (and, accordingly, the bitmap 802) is included in the Block Ack information field 402-6. In this case, the single Ack information subfield 800 is included in a predetermined location within the Block Ack information field 402-6, in an embodiment. For example, the single Ack information subfield 800 is included as the first field or the last field in the Block Ack information field 402-6. On the other hand, if the Single MPDU Ack indication is set to a value (e.g., a logic zero (0)) that indicates that the single Ack information subfield 800 is not included in the Block Ack information field 402-6, then the single Ack information subfield 800 is omitted from the Block Ack information field 402-6.

Turning now to FIG. 8B, the single Ack information subfield 830 corresponds to the per-TID information subfield 602-1 of the Block Ack information subfield 600 of FIG. 6, in an embodiment. Further, in an embodiment, the single Ack information subfield 830 omits the Block Ack starting sequence control subfield 602-2 and the Block Ack bitmap subfield 603-3 that are included in the Block Ack information subfield 600 of FIG. 6. The single Ack information subfield 830 includes a plurality of subfields 832 including an Ack subfield 832-1, a reserved field 832-2 and a TID value field 832-3. The Ack subfield 832-1 is set to indicate that the single Ack information subfield 830 is a single Ack information field that includes an acknowledgement of a single MPDU in the A-MPDU being acknowledged and not a Block Ack information subfield that includes a block acknowledgement to acknowledge a set of multiple MPDUs in the A-MPDU being acknowledged. The TID value field 832-3 is set to indicate a TID corresponding to the traffic class of the single MPDU being acknowledged. In an embodiment, the TID value field 832-3 is generally the same as the TID value subfield 702-2 described above with respect to FIG. 7. In another embodiment, the TID value field 832-3 is different from the TID value subfield 702-2 described with respect to FIG. 7. In an embodiment, a value (e.g., logic one (1)) of the Ack subfield 832-1 indicates that a single MPDU of the traffic class indicated by the TID value field 832-3 was successfully received.

In an embodiment, the Block Ack information field 402-6 includes one or single Ack information subfields 830 to respectively acknowledge one or more single MPDUs included in the A-MPDU that is being acknowledged that were successfully received. Thus, for example, if the A-MPDU being acknowledged includes only one single A-MPDU corresponding to a particular traffic class, and the one single MPDU was successfully received, then the Block Ack information field 402-6 includes one single Ack information subfield 830 to acknowledge successful receipt of the one single MPDU that was successfully received. On the other hand, if the A-MPDU being acknowledged includes multiple single MPDUs respectively corresponding to different traffic classes, and the multiple single MPDUs were successfully received, then the Block Ack information subfield 402-6 includes multiple single Ack information subfields 830 to respectively acknowledge successful receipt of the multiple single MPDUs, in an embodiment.

Turning now to FIG. 8C, the single acknowledgement information subfield 860 corresponds to the per-TID information subfield 602-1 of the Block Ack information subfield 600 of FIG. 6, in an embodiment. Further, in an embodiment, the single Ack information subfield 860 omits the Block Ack starting sequence control subfield 602-2 and the Block Ack bitmap subfield 603-3 that are included in the Block Ack information subfield 600 of FIG. 6. The single Ack information subfield 860 is generally similar to the single Ack information subfield 830 of FIG. 8B except that the single Ack information subfield 860 includes management acknowledgement information in addition to single MPDU acknowledgement information, in an embodiment. The Block Ack information subfield 860 includes a plurality of subfields 862 including an Ack subfield 862-1, a management Ack subfield 862-2, a reserved field 862-3 and the TID value field 832-3. The Ack subfield 862-1 is set to indicate that the single Ack information subfield 860 is a single Ack information field that includes single acknowledgement information to acknowledge a single data unit or acknowledgement information to acknowledge a management or a control frame, and not a Block Ack information field that includes block acknowledgement information to acknowledge a set of multiple data units. A first value (e.g., logic one (1)) of the management Ack subfield 862-2 indicates that the Ack information subfield 860 is acknowledging a management frame included in the A-MPDU being acknowledged. In an embodiment, if the management Ack subfield 862-2 is set to the first value (e.g., logic one (1)), then the TID value subfield 832-3 is reserved or is disregarded by the receiving device. On the other hand, a second value (e.g., logic zero (0)) of the management Ack subfield 862-2 indicates that the Ack information subfield 860 is acknowledging a single data MPDU in the A-MPDU being acknowledged. In this case, the TID value subfield 832-3 indicates the traffic class of the single data MPDU being acknowledged as described above with respect to FIG. 8B, in an embodiment. The Block Ack information field 402-6 includes one or more single Ack information subfields 860 to respectively acknowledge a management/control frame and/or one or more single data MPDUs included in the A-MPDU that is being acknowledged that were successfully received, in the manner described above with respect to FIG. 8B, in an embodiment.

Figure 9:
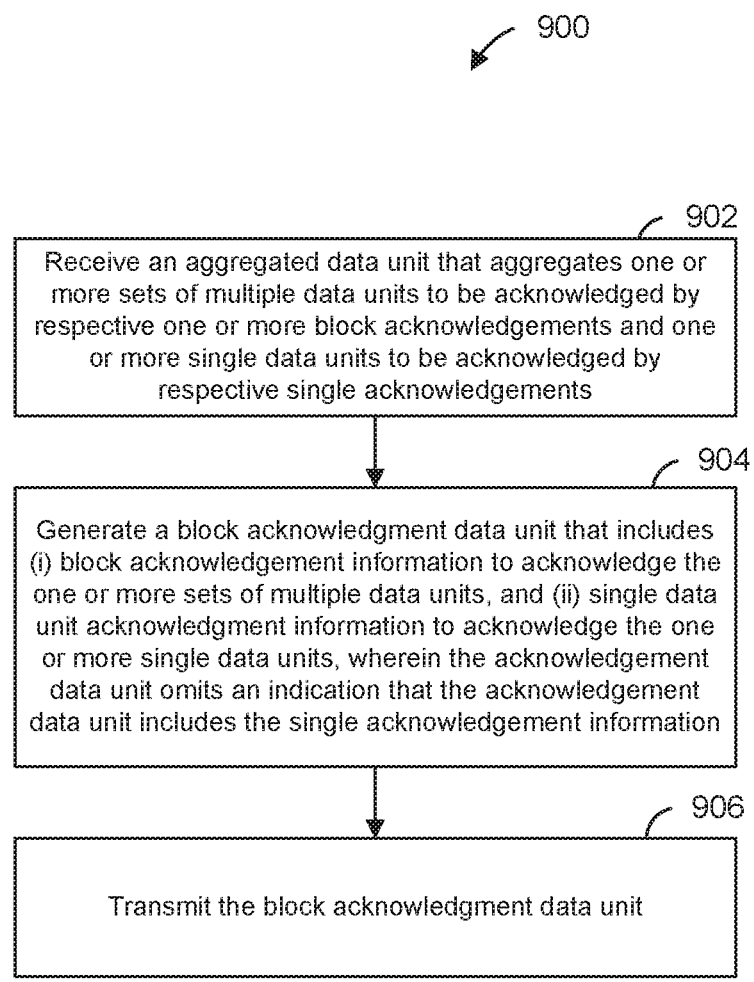
FIG. 9 is a flow diagram of an example method for acknowledging receipt of a transmission in a communication network, according to an embodiment.

FIG. 9 is a flow diagram of an example method 900 for acknowledging receipt of data units in a communication network, according to an embodiment. In an embodiment, the method 900 is implemented by a first communication device. The first communication device is an AP such as the AP 14 or a client station such as the client station 25-1, for example, in various embodiments. For example, the method 900 is implemented by the MAC processor 18 and/or by the PHY processor 20 of the AP 14, in an embodiment. As another example, the method 900 is implemented by the MAC processor 28 and/or by the PHY processor 29 of the client station 25-1, in another embodiment. In other embodiments, the method 900 is implemented by other suitable communication devices.

At block 902, a data unit is received. In an embodiment, a PHY data unit is received. In an embodiment, the data unit 200 of FIG. 2 or the data unit 310 of FIG. 3 is received. In another embodiments, a suitable PHY data unit different from the data unit 200 of FIG. 2 or the data unit 310 of FIG. 3 is received. The PHY data unit includes multiple MAC data units aggregated in an aggregate MAC data unit, in an embodiment. In an embodiment, the multiple MAC data units include (i) one or more sets or blocks of MAC data units respectively corresponding to one or more different traffic classes and (ii) one or more single MAC data units respectively corresponding to one or more different traffic classes. In some embodiments, in addition to or instead of the one or more sets or blocks of MAC data units and/or the one or more single MAC data units, the multiple MAC data units include a management frame or a control frame for which acknowledgement is required or expected.

At block 904, a block acknowledgement frame to acknowledge receipt of the multiple MAC data units is generated. In an embodiment, the block acknowledgement frame 320 of FIG. 3 is generated. In another embodiment, a suitable acknowledgement frame different from the acknowledgement frame 320 of FIG. 3 is generated. In an embodiment, the block acknowledgement frame includes (i) block acknowledgement information to acknowledge one or more sets or blocks of MAC data units, respectively corresponding to one or more different traffic classes, in the data unit received at block 902 and (ii) single data unit acknowledgement information to acknowledge one or more single MAC data units, respectively corresponding to one or more different traffic classes, in the data unit received at block 902. In an embodiment, the block acknowledgement frame includes the single data unit acknowledgement information, in addition to the block acknowledgement information, by default even if the data unit received at block 902 does not include any single MAC data units. Accordingly, in an embodiment, the block acknowledgement frame omits an indication of whether or not the block acknowledgement frame includes the single data unit acknowledgement information.

In some embodiments, the block acknowledgement frame additionally includes acknowledgement information to acknowledge one or more management or control frames included in the data unit received at block 902.

At block 906, the block acknowledgement frame generated at block 904 is transmitted to a communication device from which the data unit was received at block 902.

In an embodiment, a method for acknowledging receipt of a transmission in a communication network includes receiving, at a first communication device from a second communication device, an aggregated data unit that aggregates (i) one or more sets of multiple data units, each set of multiple data units to be acknowledged by a respective block acknowledgement and (ii) one or more single data units, each single data unit to be acknowledged by a respective single acknowledgement; generating, at the first communication device, a block acknowledgment frame that includes (i) block acknowledgement information to acknowledge the one or more sets of multiple data units, and (ii) single acknowledgment information to acknowledge the one or more single data units, wherein the block acknowledgement frame omits an indication that the block acknowledgement frame includes the single acknowledgement information; and causing the block acknowledgment frame to be transmitted from the first communication device to the second communication device.

In other embodiments, the method further includes one of, or any suitable combination of two or more of, the following features.

The one or more single data units include multiple single data units respectively corresponding to different traffic classes of a plurality of traffic classes.

Generating the block acknowledgement frame includes generating a single acknowledgement information field to include the single acknowledgement information to acknowledge the multiple single data units corresponding to the different traffic classes.

The single acknowledgement information field includes a bitmap, wherein (i) each bit of the bitmap corresponds to a traffic class and (ii) a bit of the bitmap acknowledges receipt of a single data unit, of the multiple single data units, the single data unit being of the corresponding traffic class.

Generating the block acknowledgement frame includes generating a block acknowledgement information field to include (i) the block acknowledgement information and (ii) the single acknowledgement information field, wherein the single acknowledgement information field is included at a predetermined location within the block acknowledgement information field.

The aggregated data unit further aggregates one or (i) a management frame and (ii) a control frame, and wherein generating the block acknowledgement frame includes generating the block acknowledgement frame to further include acknowledgement information to acknowledge receipt of the one of (i) the management frame and (ii) the control frame.

The one or more sets of multiple data units include multiple sets of multiple data units, wherein respective ones of the multiple sets of multiple data units correspond to different traffic classes of a plurality of traffic classes.

Generating the block acknowledgement frame includes generating multiple block acknowledgement information fields to include the block acknowledgement information, wherein respective ones of the multiple block acknowledgement information fields include block acknowledgement information for respective sets of data unit corresponding to respective ones of the different traffic classes.

Generating the block acknowledgment frame includes generating a bitmap to acknowledge a set of multiple data unit of the one or more sets of multiple data units, wherein respective bits in the bitmap acknowledge respective data units of the set of multiple data units.

The method further comprises selecting, at the first communication device, a length of the bitmap from a plurality of predetermined lengths, and wherein generating the bitmap comprises generating the bitmap having the selected length.

Generating the block acknowledgement frame includes generating the block acknowledgement frame to further include an indication of the selected length.

Generating the block acknowledgement frame comprises generating at least one block acknowledgement information field to include the block acknowledgement information and at least one single acknowledgement information field to include the single acknowledgement information, wherein each of the at least one single acknowledgement information fields is shorter than each of the at least one block acknowledgement information fields.

In another embodiment, an apparatus comprises a network interface having one or more integrated circuits configured to receive an aggregated data unit that aggregates (i) one or more sets of multiple data units to be acknowledged by respective one or more block acknowledgements and (ii) one or more single data units to be acknowledged by respective single acknowledgements. The one or more integrated circuits are also configured to generate a block acknowledgment frame that includes (i) block acknowledgement information to acknowledge the one or more sets of multiple data units, and (ii) single acknowledgment information to acknowledge the one or more single data units, wherein the block acknowledgement frame omits an indication that the block acknowledgement frame includes the single acknowledgement information. The one or more integrated circuits are further configured to cause the block acknowledgment data unit to be transmitted.

In other embodiments, the apparatus further comprises one of, or any suitable combination of two or more of, the following features.

The one or more single data units include multiple single data units respectively corresponding to different traffic classes of a plurality of traffic classes.

The one or more integrated circuits are configured to generate a single acknowledgement information field to include the single acknowledgement information to acknowledge the multiple single data units corresponding to the different traffic classes.

The single acknowledgement information field includes a bitmap, wherein (i) each bit of the bitmap corresponds to a traffic class and (ii) a bit of the bitmap acknowledges receipt of a single data unit, of the multiple single data units, the single data unit being of the corresponding traffic class.

The one or more integrated circuits are configured to generate a block acknowledgement information field to include (i) the block acknowledgement information and (ii) the single acknowledgement information field, wherein the single acknowledgement information field is included at a predetermined location within the block acknowledgement information field.

The aggregated data unit further aggregates one of (i) a management frame and (ii) a control frame, and wherein the one or more integrated circuits are configured to generate the block acknowledgement frame to further include acknowledgement information to acknowledge receipt of the one of (i) the management frame and (ii) the control frame.

The one or more sets of multiple data units include multiple sets of multiple data units, wherein respective ones of the multiple sets of multiple data units correspond to different traffic classes of a plurality of traffic classes.

The one or more integrate circuits are configured to generate multiple block acknowledgement information fields to include the block acknowledgement information, wherein respective ones of the multiple block acknowledgement information fields include block acknowledgement information for respective sets of data unit corresponding to respective ones of the different traffic classes.

The one or more integrated circuits are configured to generate a bitmap to acknowledge a set of multiple data units, of the one or more sets of multiple data units, wherein respective bits in the bitmap acknowledge respective data units of the set of multiple data units.

The one or more integrated circuits are configured to generate the block acknowledgement data unit to include the bitmap.

The one or more integrated circuits are further configured to select a length of the bitmap from a plurality of predetermined lengths.

The one or more integrated circuits are further configured to generate the bitmap having the selected length.

The one or more integrated circuits are configured to generate the block acknowledgement frame to further include an indication to indicate the selected length.

The one or more integrated circuits are configured to generate (i) at least one block acknowledgement information field to include the block acknowledgement information and (ii) at least one single acknowledgement information field to include the single acknowledgement information, wherein each of the at least one single acknowledgement information field is shorter than each of the at least one block acknowledgement information field.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium, or media, such as a magnetic disk, an optical disk, a random access memory (RAM), a read only memory (ROM), a flash memory, a memory of a processor, a tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for acknowledging receipt of a transmission in a communication network, the method comprising:
   receiving, at a first communication device from a second communication device, an aggregated data unit that includes (i) one or more sets of multiple data units, each set of multiple data units to be acknowledged by a respective block acknowledgement, (ii) multiple single data units, each single data unit to be acknowledged by a single acknowledgement, and (iii) a management frame;
   generating, at the first communication device, a block acknowledgment frame that includes a block acknowledgment control field and a block acknowledgment information field, wherein the block acknowledgment control field includes a bit to acknowledge the management frame, and wherein the block acknowledgment information field includes (i) block acknowledgement information to acknowledge the one or more sets of multiple data units, and (ii) single acknowledgment information to acknowledge the multiple single data units; and
   causing the block acknowledgment frame to be transmitted from the first communication device to the second communication device.

2. The method of claim 1, wherein:
   the multiple single data units respectively corresponding to different traffic classes of a plurality of traffic classes, and
   generating the block acknowledgement frame includes generating a single subfield in the block acknowledgement information field to include the single acknowledgement information to acknowledge the multiple single data units corresponding to the different traffic classes.

3. The method of claim 2, wherein the single subfield in the block acknowledgement information field includes a bitmap, wherein (i) each bit of the bitmap corresponds to a traffic class and (ii) a bit of the bitmap acknowledges receipt of a single data unit, of the multiple single data units, the single data unit being of the corresponding traffic class.

4. The method of claim 3, wherein the single subfield in the block acknowledgement information field is included at a predetermined location within the block acknowledgement information field.

5. The method of claim 1, wherein generating the block acknowledgment frame includes generating a bitmap within the block acknowledgment information field to acknowledge a set of multiple data units of the one or more sets of multiple data units, wherein respective bits in the bitmap acknowledge respective data units of the set of multiple data units.

6. The method of claim 5, further comprising selecting, at the first communication device, a length of the bitmap from a plurality of predetermined lengths, and wherein generating the bitmap comprises generating the bitmap having the selected length.

7. The method of claim 6, wherein generating the block acknowledgement frame includes generating the block acknowledgement control field to further include an indication of the selected length of the bitmap in the block acknowledgment information field.

8. The method of claim 1, wherein generating the block acknowledgement frame comprises generating the block acknowledgement information field to include (i) one or more first subfields with respective block acknowledgment information to acknowledge the one or more sets of multiple data units, and (ii) multiple second subfields with respective single acknowledgement information to acknowledge the multiple single data units, wherein each of the multiple second subfields is shorter than each of the one or more first subfields.

9. A method for acknowledging receipt of a transmission in a communication network, the method comprising:
   receiving, at a first communication device from a second communication device, an aggregated data unit that includes (i) multiple sets of multiple data units wherein respective ones of the multiple sets of multiple data units correspond to different traffic classes of a plurality of traffic classes, each set of multiple data units to be acknowledged by a respective block acknowledgement, (ii) one or more single data units, each single data unit to be acknowledged by a single acknowledgement, and (iii) a management frame;
   generating, at the first communication device, a block acknowledgment frame that includes a block acknowledgment control field and a block acknowledgment information field, wherein the block acknowledgment control field includes a bit to acknowledge the management frame, and wherein the block acknowledgment information field includes (i) block acknowledgement information to acknowledge the multiple sets of multiple data units, and (ii) single acknowledgment information to acknowledge the one or more single data units; and
   causing the block acknowledgment frame to be transmitted from the first communication device to the second communication device.

10. The method of claim 9, wherein the generating a block acknowledgment frame includes generating multiple subfields within the block acknowledgement information field to include the block acknowledgement information, wherein respective ones of the multiple subfields include block acknowledgement information for respective sets of data units corresponding to respective ones of the different traffic classes.

11. An apparatus, comprising:
    a network interface having one or more integrated circuits configured to:
       receive an aggregated data unit that includes (i) one or more sets of multiple data units to be acknowledged by respective one or more block acknowledgements, (ii) multiple single data units to be acknowledged by respective single acknowledgements acknowledgement, and (iii) a management frame;

generate a block acknowledgment frame that includes a block acknowledgment control field and a block acknowledgment information field, wherein the block acknowledgment control field includes a bit to acknowledge the management frame, and wherein the block acknowledgment information field includes (i) block acknowledgement information to acknowledge the one or more sets of multiple data units, and (ii) single acknowledgment information to acknowledge the multiple single data units; and cause the block acknowledgment data unit to be transmitted.

12. The apparatus of claim 11, wherein:

the multiple single data units respectively corresponding to different traffic classes of a plurality of traffic classes, and the one or more integrated circuits are configured to generate a single subfield in the block acknowledgement information field to include the single acknowledgement information to acknowledge the multiple single data units corresponding to the different traffic classes.

13. The apparatus of claim 12, wherein the single subfield in the block acknowledgement information field includes a bitmap, wherein (i) each bit of the bitmap corresponds to a traffic class and (ii) a bit of the bitmap acknowledges receipt of a single data unit, of the multiple single data units, the single data unit being of the corresponding traffic class.

14. The apparatus of claim 13, wherein the single subfield in the block acknowledgement information field is included at a predetermined location within the block acknowledgement information field.

15. The apparatus of claim 11, wherein the one or more integrated circuits are configured to:

generate a bitmap within the block acknowledgment information field to acknowledge a set of multiple data units, of the one or more sets of multiple data units, wherein respective bits in the bitmap acknowledge respective data units of the set of multiple data units, and generate the block acknowledgement data unit to include the bitmap.

16. The apparatus of claim 15, wherein the one or more integrated circuits are further configured to:

select a length of the bitmap from a plurality of predetermined lengths, and generate the bitmap having the selected length.

17. The apparatus of claim 16, wherein the one or more integrated circuits are configured to generate the block acknowledgement control field to further include an indication to indicate the selected length of the bitmap in the block acknowledgment information field.

18. The apparatus of claim 11, wherein the one or more integrated circuits are configured to generate the block acknowledgement information field to include (i) one or more first subfields with respective block acknowledgment information to acknowledge the one or more sets of multiple data units, and (ii) multiple second subfields with respective single acknowledgement information to acknowledge the multiple single data units, wherein each of the multiple second subfields is shorter than each of the one or more first subfields.

19. An apparatus, comprising:

a network interface having one or more integrated circuits configured to:

receive an aggregated data unit that includes (i) multiple sets of multiple data units corresponding to different traffic classes of a plurality of traffic classes to be acknowledged by respective block acknowledgements, (ii) one or more single data units to be acknowledged by respective single acknowledgements acknowledgement, and (iii) a management frame;

generate a block acknowledgment frame that includes a block acknowledgment control field and a block acknowledgment information field, wherein the block acknowledgment control field includes a bit to acknowledge the management frame, and wherein the block acknowledgment information field includes (i) block acknowledgement information to acknowledge the multiple sets of multiple data units, and (ii) single acknowledgment information to acknowledge the one or more single data units; and cause the block acknowledgment data unit to be transmitted.

20. The apparatus of claim 19, wherein the one or more integrate circuits are configured to generate multiple subfields within the block acknowledgement information field to include the block acknowledgement information, wherein respective ones of the multiple subfields include block acknowledgement information for respective sets of data unit units corresponding to respective ones of the different traffic classes.

* * * * *